(12) United States Patent
Diatzikis et al.

(10) Patent No.: US 8,076,909 B2
(45) Date of Patent: Dec. 13, 2011

(54) METHOD AND SYSTEM FOR MONITORING THE CONDITION OF GENERATOR END WINDINGS

(75) Inventors: Evangelos Diatzikis, Chuluota, FL (US); Hans-Gerd Brummel, Berlin (DE); Michael Twerdochlib, Oviedo, FL (US); Lutz Intichar, Mülheim an der Ruhr (DE); Matthias Humer, Dortmund (DE); Detlef Frerichs, Mülheim (DE)

(73) Assignee: Siemens Energy, Inc., Orlando, FL (US)

( * ) Notice: Subject to any disclaimer, the term of this patent is extended or adjusted under 35 U.S.C. 154(b) by 737 days.

(21) Appl. No.: 12/209,333

(22) Filed: Sep. 12, 2008

(65) Prior Publication Data

US 2010/0066315 A1   Mar. 18, 2010

(51) Int. Cl.
*H02K 11/00* (2006.01)
(52) U.S. Cl. ............. 322/99; 324/546; 356/462; 385/12
(58) Field of Classification Search ............. 322/99; 356/462; 324/546; 385/12
See application file for complete search history.

(56) References Cited

U.S. PATENT DOCUMENTS

| | | | | |
|---|---|---|---|---|
| 4,828,389 A * | 5/1989 | Gubbins et al. | ............... | 356/462 |
| 4,940,933 A * | 7/1990 | Jenkins | ............... | 324/765.01 |
| 5,146,776 A | 9/1992 | Twerdochlib et al. | ........ | 73/1.85 |
| 5,157,461 A * | 10/1992 | Page | ............... | 356/462 |
| 5,315,956 A * | 5/1994 | Reno | ............... | 116/216 |
| 5,319,356 A * | 6/1994 | Yoshino | ............... | 340/584 |
| 5,680,489 A | 10/1997 | Kersey | ............... | 385/12 |
| 5,684,718 A | 11/1997 | Jenkins et al. | ............... | 702/57 |
| 5,831,511 A | 11/1998 | Manning et al. | ............... | 338/25 |
| 5,892,860 A | 4/1999 | Maron et al. | ............... | 385/12 |
| 6,212,306 B1 | 4/2001 | Cooper et al. | ............... | 385/12 |
| 6,246,048 B1 | 6/2001 | Ramos et al. | ............... | 250/227.18 |
| 6,346,754 B1 | 2/2002 | Kieda et al. | ............... | 310/58 |
| 6,636,041 B2 | 10/2003 | Arz et al. | ............... | 324/322 |
| 6,721,470 B2 | 4/2004 | Bosselmann et al. | ........... | 385/12 |
| 6,807,325 B1 | 10/2004 | Kraemmer et al. | ............... | 385/13 |
| 6,886,977 B2 | 5/2005 | Kaminski et al. | ............... | 374/152 |
| 7,174,075 B2 | 2/2007 | Drubel et al. | ............... | 385/101 |
| 7,336,862 B1 | 2/2008 | Xai et al. | ............... | 385/12 |
| 7,549,803 B2 * | 6/2009 | Thompson et al. | ............... | 385/88 |
| 7,604,399 B2 * | 10/2009 | Twerdochlib et al. | ............... | 374/130 |
| 7,787,113 B2 * | 8/2010 | Aiello et al. | ............... | 356/237.1 |
| 2005/0035768 A1 * | 2/2005 | Rabach et al. | ............... | 324/546 |
| 2005/0061058 A1 | 3/2005 | Willsch et al. | ............... | 73/23.32 |
| 2007/0063859 A1 * | 3/2007 | Twerdochlib et al. | ........ | 340/679 |
| 2008/0036336 A1 | 2/2008 | Salem et al. | ............... | 310/68 B |
| 2008/0041162 A1 | 2/2008 | Twerdochlib | ............... | 73/649 |
| 2008/0245980 A1 * | 10/2008 | Diatzikis | ............... | 250/559.08 |
| 2008/0247702 A1 * | 10/2008 | Thompson et al. | ............... | 385/12 |
| 2008/0298428 A1 * | 12/2008 | Twerdochlib et al. | ........ | 374/121 |

FOREIGN PATENT DOCUMENTS

| | | |
|---|---|---|
| DE | 19962668 C1 | 12/2000 |
| EP | 1890374 A2 | 2/2008 |
| WO | 9831987 A1 | 7/1998 |

\* cited by examiner

*Primary Examiner* — Pedro J Cuevas

(57) ABSTRACT

A method and system for monitoring the operating conditions of an electric generator. The system includes a triad sensor array formed within a predetermined section of a fiber optic conductor. The triad sensor array is formed of a group of sensors including a first sensor including a Bragg grating for producing a first signal representative of strain in a stator bar of the generator, a second sensor including a Bragg grating for producing a second signal representative of temperature in the stator bar, and a third sensor including a Bragg grating for producing a third signal representative of vibration amplitude in the stator bar.

20 Claims, 4 Drawing Sheets

US 8,076,909 B2

METHOD AND SYSTEM FOR MONITORING THE CONDITION OF GENERATOR END WINDINGS

FIELD OF THE INVENTION

The present invention relates generally to monitoring the condition of electrical machines and, more particularly, to a method and system for monitoring the condition of electrical machines by obtaining multiple measurements through a fiber optic conduit to monitor the condition of an electrical machine.

BACKGROUND OF THE INVENTION

An electrical generator used in the field of electrical power generation includes a stator winding having a large number of conductor or stator bars that are pressed into slots in a base body, in particular, a laminated stator core or a rotor body. Such an electrical generator represents a very expensive and long-term investment. Its failure not only endangers the power equipment itself but may also result in very severe service reduction due to the down time associated with repair. To avoid such a condition, increasing use is being made of a diagnostic system for early identification of defects. The diagnostic system furthermore allows a higher utilization level, making the power equipment more financially viable.

Due to the very high voltages within the generator, diagnostic systems for generators generally use sensor technology that avoids electrically conducting wires that could cause arcing to ground if they are deployed on a structure that is at a high voltage. As an alternative to conveying signals on conducting wires, sensing signals within generators have been conveyed by optical conductors, such as by glass fibers. For example, one known diagnostic system provides a vibration sensor on the end windings of the generator. In this form of system, the vibration sensor may comprise an accelerometer including a mass-spring component with light transmitting a signal, corresponding to the movement of the mass, through glass fibers. This type of system may provide an acceleration output signal that can be converted to deflections and analyzed for amplitudes and phases.

Although the signals from a vibration sensor are proportional to the stress in the material of the stator bar, the proportionality factor may be difficult to accurately determine. For example, the proportionality factor may vary depending on the design of the end winding and may further vary from bar to bar, such as may result from varying installation conditions including variations in the tightness of each stator bar within a respective slot.

In a further approach to determining vibration associated with the stator bars, an optical fiber sensor including a Bragg grating may be located on ripple springs adjacent stator bar ends to detect changes in the frequency of signals received from the sensor. The detected changes may be indicative of a change of elasticity of the ripple spring and/or other conditions that may cause the stator bars to move. Such a monitor is disclosed in Patent Application Publication US 2008/0036336 A1.

It is preferable to obtain strain measurements directly on stator bars to provide a direct indication of the stress applied to a particular stator bar. In addition, for long term condition based maintenance it may be desirable to further obtain information from a strain measuring sensor indicative of strain on stator bars in combination with information from a vibration measuring sensor indicative of an amplitude of vibration of stator bars to provide data that may be used to track and/or predict fatigue of parts in the stator core.

SUMMARY OF THE INVENTION

In accordance with one aspect of the invention, a method of monitoring the operating condition of an electric generator is provided. The method comprises: locating a triad sensor array on a stator bar of the generator, the triad sensor array comprising a group of sensors including first, second and third sensors formed within a predetermined section of a fiber optic conductor; producing a triad signal indicative of the operating condition of a stator bar in the generator. The step of producing a triad signal comprises: producing a first, base measurement signal indicative of a stress level in the stator bar; producing a second, adjustment signal indicative of an adjustment to the base measurement signal and based on a measurement taken at the stator bar; and producing a third, dynamic measurement signal of substantially cyclically varying value and indicative of a stress level in the stator bar. The method further comprises supplying optical radiation to the fiber optic conductor for providing the triad sensor array with optical radiation for producing the first, second and third signals, and receiving the first, second and third signals from the triad sensor array for effecting a first stress level determination, and for effecting a second stress level determination substantially simultaneously with and independently of the first stress level determination.

In accordance with another aspect of the invention, a system is provided for monitoring the operating condition of an electric generator comprising a stator core including a plurality of stator bars located in circumferentially spaced relation to each other about a rotor. The system comprises a fiber optic conductor and a plurality of triad sensor arrays formed in the fiber optic conductor, where each the triad sensor array is associated with one of the stator bars. Each triad sensor array comprises a first sensor including a first Bragg grating for producing a base measurement signal indicative of a stress level in a stator bar of the generator, a second sensor including a second Bragg grating for producing an adjustment signal indicative of an adjustment to the base measurement and based on a measurement taken at the stator bar, and a third sensor including a third Bragg grating for producing a dynamic measurement signal of substantially cyclically varying value and indicative of a stress level in the stator bar. The system further comprises a source of optical radiation coupled to the fiber optic conductor for providing the first, second and third sensors of each the triad sensor array with optical radiation for producing the base measurement signal, the adjustment signal and the dynamic measurement signal. In addition, an optical detector is coupled to the fiber optic conductor for receiving the signals from the first, second and third sensors of each the triad sensor array, wherein the base measurement signal, the adjustment signal and the dynamic measurement signal are uniquely identified to the first, second and third sensors, respectively, of each of the triad sensor arrays.

In accordance with a further aspect of the invention, a system is provided for monitoring the operating conditions of an electric generator. The system comprises a triad sensor array formed within a predetermined section of a fiber optic conductor. The triad sensor array comprises a group of sensors including a first sensor including a Bragg grating for producing a first signal representative of strain in a stator bar of the generator, a second sensor including a Bragg grating for producing a second signal representative of temperature in the stator bar, and a third sensor including a Bragg grating for producing a third signal representative of vibration amplitude in the stator bar. The system further comprises a source of optical radiation coupled to the fiber optic conductor for providing the first, second and third sensors with optical radiation for producing the first, second and third signals. An optical detector is coupled to the fiber optic conductor for receiving the first, second and third signals, wherein the first, second and third signals are uniquely identified to the first, second and third sensors, respectively.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
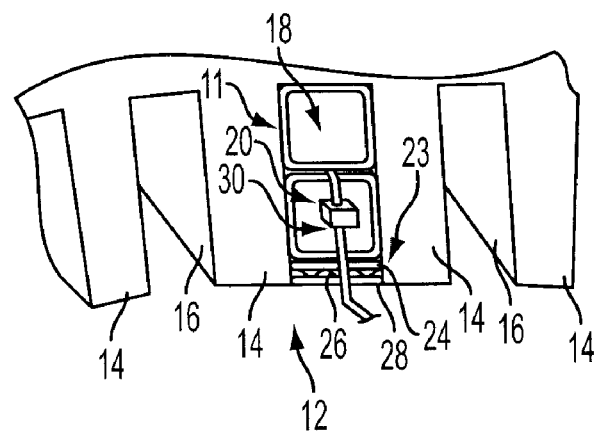
FIG. 1 is a perspective illustrating a portion of a stator core and showing a location of a triad sensor array in accordance with an embodiment of the invention.
Figure 2:
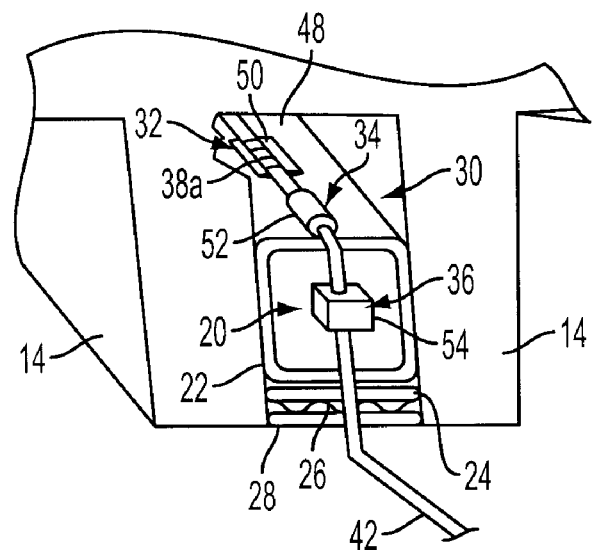
FIG. 2 is an enlarged view of an end of a stator bar illustrating an installation of a triad sensor array in accordance with an embodiment of the invention.

Referring to FIG. 1, a portion of a stator core winding for an electric generator is illustrated and includes a stator core 12 comprising a plurality of stator teeth 14 defining radially extending slots 16. The stator core 12 comprises stator coils 11 including one or more stator bars located in each slot 16. In the illustrated embodiment, a pair of stator bars, including a bottom stator bar 18 and a top stator bar 20, is located in stacked relation within each slot 16. The stator bars 18, 20 may be wrapped in an insulation layer 22 forming a ground wall insulation, as seen in FIG. 2. The bars 18, 20 are retained in position by a retention structure 23 comprising one or more filler members, such as top slot fillers 24 and a top ripple spring 26 placed in the slot 16 radially inwardly from the top stator bar 20. The retention structure 23 further comprises a wedge 28 installed in the slot 16, located radially inwardly from the top ripple spring 26 to compress the stator bars 18, 20 in the slot 16 with a predetermined tightness and substantially limit movement of the bars 18, 20 relative to the stator core 12.

While the position of the bars 18, 20 is substantially maintained by the retention structure 23, a certain degree of bending movement of the bars 18, 20 still occurs in response to vibrations within the generator, causing stress in the material of the bars 18, 20, such as may be detected by a strain measurement on a surface of one or more of the bars 18, 20.

In accordance with the present invention, the condition of the stator bars 18, 20 may be monitored with a triad sensor array 30. For the purposes of this description, the triad sensor array 30 will be described with reference to monitoring of a triad sensor array 30 on the top stator bar 20. The triad sensor array 30 includes three sensors, i.e., a first sensor 32, a second sensor 34, and a third sensor 36, located on the stator bar 20 and selected to provide signals comprising data for implementing a condition monitoring method in accordance with an embodiment of the present invention.

The signal produced by the first sensor 32 comprises a first, base measurement signal indicative of a stress level in the stator bar 20. The signal produced by the second sensor 34 comprises a second, adjustment signal indicative of an adjustment to the base measurement signal and based on a measurement taken at the stator bar 20. The signal produced by the third sensor 36 comprises a third, dynamic measurement signal of substantially cyclically varying value and indicative of a stress level in the stator bar 20. In particular, the third signal may comprise an acceleration signal that may be integrated twice to provide data on the displacement of the end of the stator bar 20.

The first sensor 32 of the triad sensor array 30 may comprise a strain sensor, the second sensor 34 may comprise a temperature sensor, and the third sensor 36 may comprise a vibration amplitude sensor. The first, second and third sensors 32, 34, 36 each preferably comprise a fiber optic sensor including a respective Bragg grating 38a, 38b, 38c wherein each sensor 32, 34, 36 is formed with a unique grating grid spacing. The Bragg grating 38a-c of each sensor 32, 34, 36 has a grating spacing that corresponds to a unique central Bragg wavelength $\lambda$ (frequency). That is, the spacing of diffraction lines in the Bragg gratings 38a-c of each sensor 32, 34, 36 is unique to the particular sensor 32, 34, 36 to reflect light at a wavelength identified with that sensor 32, 34, 36. Specifically, each sensor 32, 34, 36 has a unique central Bragg wavelength assigned to it, and variations in the wavelength about the central Bragg wavelength for the sensor 32, 34, 36 provides an indication of a variation in the value of the measurand associated with the particular sensor 32, 34, 36. A source of optical radiation 40, such as a broadband light source, may be provided coupled to a common fiber optic conductor 42 at a coupler 44 for providing the triad sensor array 30 with optical radiation, and which provides a predetermined range of light wavelength (frequency) to correspond to the central Bragg wavelength $\lambda$ of any triad sensor array(s) 30 connected on the common fiber optic conductor 42. Reflected light from the triad sensor array 30 is transmitted back through the fiber optic conductor 42 and is received via the coupler 44 at an optical detector or analyzer 46.

Figure 3:
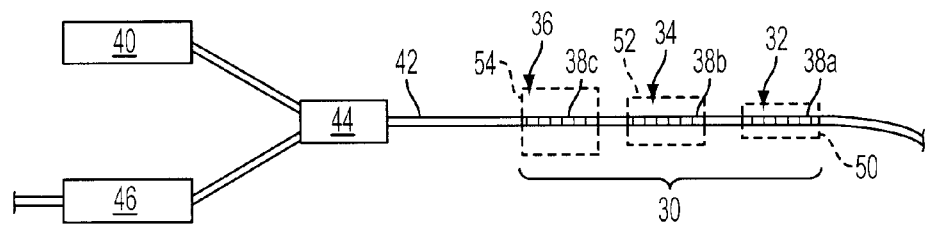
FIG. 3 is a diagrammatic illustration of an embodiment of a condition monitoring system including a triad sensor array formed with sensors in series.

As illustrated in FIG. 3, the triad sensor array 30 comprises the first, second and third sensors 32, 34, 36 arranged in series on the common fiber optic conductor 42. The first, second and third sensors 32, 34, 36 are preferably located within a six inch length. For example, the first and second sensors 32, 34 typically may be located within approximately a two inch length of the triad sensor array 30, providing a temperature measurement of the second sensor 34 within close proximity to the strain measurement of the first sensor 32, and the third sensor 36 comprising an accelerometer for vibration measurement may extend approximately three inches along the triad sensor array 30.

The first sensor 32 for measuring strain in the stator bar 20 may comprise a portion of the fiber optic conductor 42 that is mounted to a longitudinally extending surface 48 of the stator bar 20 with opposite ends of the first Bragg grating 38*a* affixed to the stator bar 20. Alternatively, the Bragg grating 38*a* may be affixed to a substrate 50 that is attached to the stator bar 20. The second sensor 34 for measuring temperature may comprised a portion of the fiber optic conductor 42 that is surrounded by a ceramic sleeve 52 to isolate the Bragg grating 38*b* from movement of the stator bar 20, to thereby isolate the Bragg grating 38*b* from strain related variations of the stator bar 20. The third sensor 36 for measuring vibration amplitude at the end of the stator bar 20 may comprise a portion of the fiber optic conductor 42 located in a housing 54 of an accelerometer. The accelerometer may comprise any known accelerometer that provides an optical output such as, for example, the Bragg grating accelerometer disclosed in U.S. Pat. No. 6,807,325, which patent is incorporated herein by reference.

Figure 4:
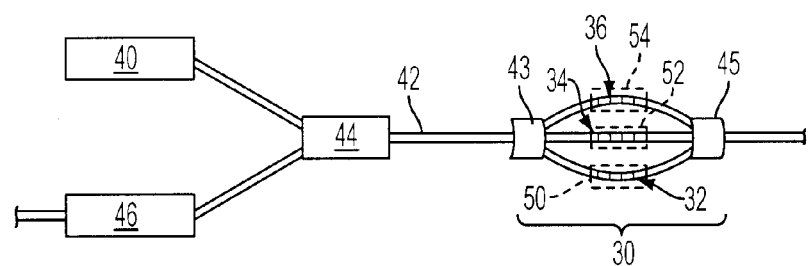
FIG. 4 is a diagrammatic illustration of an embodiment of a condition monitoring system including a triad sensor array formed with sensors in parallel.

FIG. 4 illustrates an alternative arrangement for the sensors of a triad sensor array 30 including the same sensors 32, 34, 36 as discussed above with reference to FIG. 3. The triad sensor array 30 of FIG. 4 includes the first, second and third sensors 32, 34, 36 arranged in parallel to each other. The first, second and third sensors 32, 34, 36 are arranged with one end of the sensors 32, 34, 36 connected to the light source/detector side of the fiber optic conductor 42 at a coupler 43, and an opposite end of the sensors 32, 34, 36 connected to a coupler 45 for connection to a section of the fiber optic conductor 42 for communication of the light source 40 and detector 46 to the other triad sensor arrays 30. The source optical radiation and the sensor signals may be conveyed through all of the sensors 32, 34, 36 in each triad sensor array 30 for providing a light path between and through the adjacent triad sensor arrays 30.

Figure 4A:
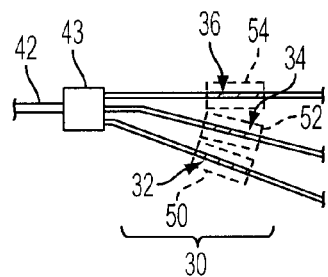
FIG. 4A is a diagrammatic illustration of an alternative configuration of the parallel sensor arrangement shown in FIG. 4.

Referring to FIG. 4A, an alternative configuration of the parallel sensor arrangement of FIG. 4 is illustrated including the same sensors 32, 34, 36 as discussed above with reference to FIG. 3. In the configuration of FIG. 4A, the first and second sensors 32 and 34 may be forked to the optical fiber conductor 42 at a coupler 43. The branch of the fiber optic conductor 42 comprising the third sensor 36 may form a continuation of the conductor 42 to the next triad sensor array 30 wherein the third sensor 36 defines a path for the source optical radiation and the sensor signals to be conveyed between and through the adjacent triad sensor arrays 30.

Figure 5:
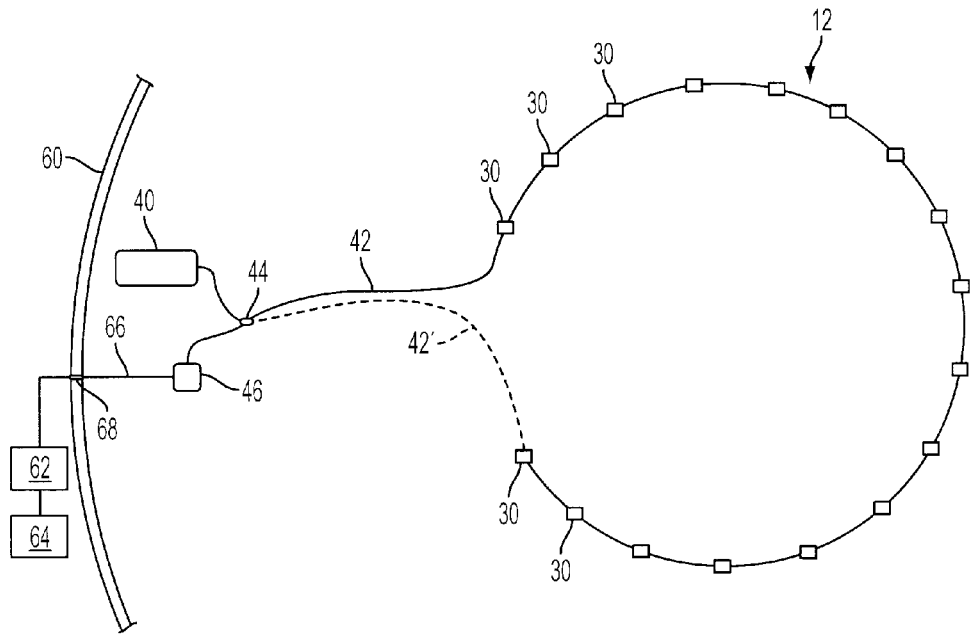
FIG. 5 is a diagrammatic illustration of an embodiment of the invention including a plurality of triad sensor arrays in series and showing a light source and detector for the monitoring system located within a generator shell.

Referring to FIG. 5, a first embodiment of a system for monitoring the operating condition of an electric generator is illustrated. The system includes a common optic fiber conductor 42 extending from the coupler 44, connected to the light source 40, and extending to a plurality of triad sensor arrays 30, where each triad sensor array 30 is associated with a respective stator bar 20 (FIG. 2) located in the stator core (referenced generally at 12), such that each stator bar 20 may have a triad sensor array 30 affixed adjacent an end thereof. The plurality of triad sensor arrays 30 of the present embodiment are connected in series along the fiber optic conductor 42. Light from the light source 40 is provided to the fiber optic conductor 42 via the coupler 44, and light reflected from the Bragg gratings 38*a-c* in each of the triad sensor arrays 30 is conveyed through the fiber optic conductor 42 to the detector 46 via the coupler 44. In the configuration of the system illustrated in FIG. 5, the light source 40 and detector 46 are located within a shell 60 of the electric generator, and data processed by the detector 46 may be communicated to a display 62 and to a plant data acquisition system 64 via an electrical line 66 passing through a penetration seal 68 in the shell 60.

It should be noted that, in addition to each of the sensors 32, 34, 36 in a given triad sensor array 30 having different central Bragg wavelengths A, the Bragg gratings 38*a-c* in each triad sensor array 30 define different central Bragg wavelengths A than the central Bragg wavelengths A of the sensors 32, 34, 36 in any other triad sensor array 30. Further, the Bragg gratings 38*a-c* defining each successive central Bragg wavelength A may be incremented a predetermined amount, e.g., 5 nm, such that the frequency band within which each sensor 32, 34, 36 operates will not overlap the frequency band of another sensor 32, 34, 36. The variation in wavelength (frequency) reflected by the Bragg grating 38*a-c* of a sensor 32, 34, 36, as caused by variations of a measurand, is preferably less than the predetermined minimum increment between central Bragg wavelengths $\lambda$. Light supplied from the light source 40, such as a broadband light source, is preferably provided at a range of wavelengths (frequencies) that spans the range of frequencies of the central Bragg wavelengths A of all of the triad sensor arrays 30.

A temperature change at the location of the first sensor 32, i.e., the strain sensor, may result in an apparent steady state change in strain at the site of the first sensor 32 due to thermal expansion of the Bragg grating 38*a* in the first sensor 32. Although a thermal expansion of the Bragg grating 38*a* would not substantially affect a dynamic vibration measurement by the first sensor 32, the temperature change may have a substantial effect on a steady state strain measurement from the first sensor 32, which strain measurement is of interest for the present invention. Hence, the sensor signal provided from the second sensor 34 may be used as a reference to adjust the measurement of the first sensor 32 for temperature variations.

It should be noted that in an alternative configuration of the system illustrated in FIG. 5, the fiber optic conductor 42 may include a branch 42' extending from the last triad sensor array 30 to connect to the fiber optic conductor 42 at the coupler 44 and thereby form a loop. In the event that a break occurs in the fiber optic conductor 42, the laser light may be conveyed to the sensors 32, 34, 36 and reflected back from the Bragg gratings 38*a-c* through the branch 42'. Alternatively, the detector 46 may receive light transmitted past the Bragg gratings 38*a-c*, where analysis of light transmitted to the detector 46 through the branch 42' indicates certain frequencies not transmitted to the detector 46 and corresponding to responses at or near the central Bragg grating wavelengths $\lambda$.

The plant data acquisition system 64 acquires data on each of the stator bars 20 as the data is analyzed by the detector 46. The data obtained from the triad sensor array 30 for each stator bar 20 comprises a first stress measurement, as determined from a strain measurement of the first sensor 32, a temperature measurement, as determined by the second sensor 34, and a second stress measurement, as determined from the third sensor 36. A direct stress level measurement is derived from the signal provided from the first sensor 32 and is indicative of a direct strain measurement obtained from the stator bar 20. The direct stress level measurement comprises a measure of steady state stress and may be adjusted to compensate for steady state temperature induced variations in the fiber optic conductor 42 using the signal from the second sensor 34. In addition, the third sensor 36 provides a third signal from the triad sensor array 30 for each stator bar 20 that comprises an indirect stress level measurement. The indirect stress level measurement is derived from the dynamic measurement signal of the third sensor 36, which is integrated twice to obtain a vibration amplitude (displacement) measurement. The vibration amplitude is analyzed with reference to the known physical properties of the stator bar 20 to determine the indirect stress level measurement. Hence, the triad sensor arrays 30 provide two stress level measurements for each stator bar 20.

The plant data acquisition system 64 may store data over the operating life of the electric generator, such as data relating to the condition of the individual stator bars 20, as well as data relating to the overall condition of the electric generator based on a combined analysis of the stator bars 20. Such data further includes frequencies, amplitudes and phases of vibration of the stator bars 20, as may be obtained from the dynamic measurement signal of the third sensor 36. In addition, a correlation between the direct stress level measurement of the first sensor 32 (as adjusted by the temperature measurement from the second sensor 34) and the indirect stress level measurement of the third sensor 36 may be used in the condition monitoring of the electric generator. The correlation between the stress level measurements of the first and third sensors 32, 36 may also be used in developing a further understanding of the relationship (correlation) between the direct and indirect stress level measurements in an electrical generator as the condition of the generator changes throughout the life of the generator. Such information may be implemented in the design and development of additional stress level monitoring equipment.

It should be noted that, as used herein, "direct" stress level measurement refers to a stress level measurement that may be determined from a strain measurement obtained at the stator bar 20 or on structure that experiences a linear variation in response to a strain in the stator bar 20, such as on the ground wall 22 surrounding the stator bar 20. "Indirect" stress level measurement, as used herein, refers to a measurement taken at the stator bar 20 that is not a strain measurement and that may be processed with known and/or assumed characteristics of the stator bar 20 to derive a stress level measurement.

Figure 6:
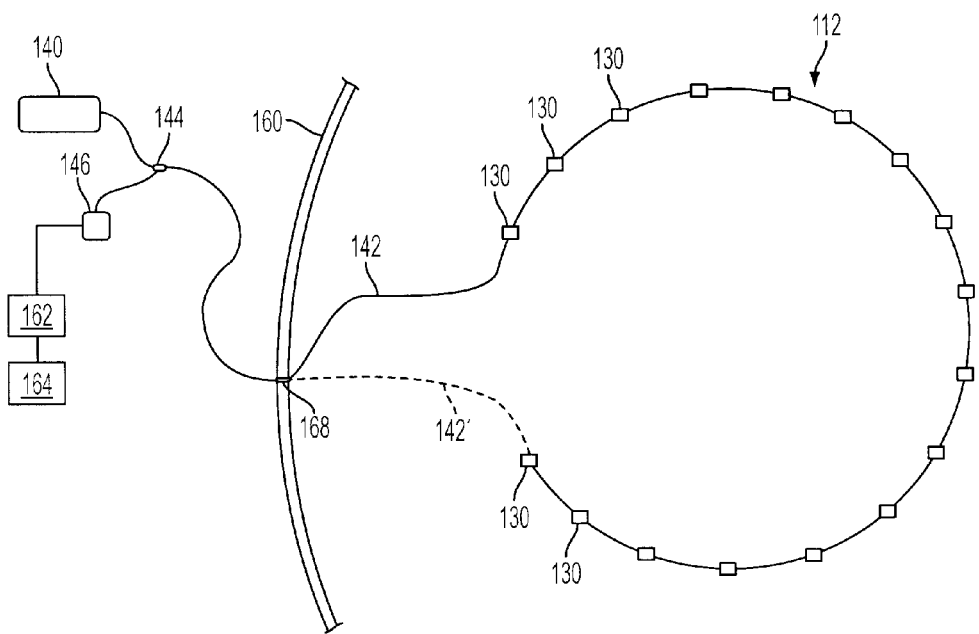
FIG. 6 is a diagrammatic illustration of an embodiment of the invention including a plurality of triad sensor arrays in series and showing a light source and detector for the monitoring system located outside of a generator shell.

Referring to FIG. 6, a second embodiment of a system for monitoring the operating condition of an electric generator is illustrated. The second embodiment includes similar elements to those described with reference to the first embodiment shown in FIG. 5, which elements are labeled with the same reference numbers increased by 100. The light source 140, detector 146 and coupler 144 for the second embodiment are located external to the generator shell 160, and the fiber optic conductor 142 carries the source light and return signals to and from the triad sensor arrays 130, where only the fiber optic conductor 142 traverses the penetration seal 168 in the generator shell 160. In an alternative configuration of that shown in FIG. 6, a branch fiber optic conductor 142' may extend from the last triad sensor array 130 and pass through the penetration seal 168 to the coupler 144 to provide an alternative path for the light in the event of a break in the fiber optic conductor 142.

Figure 7:
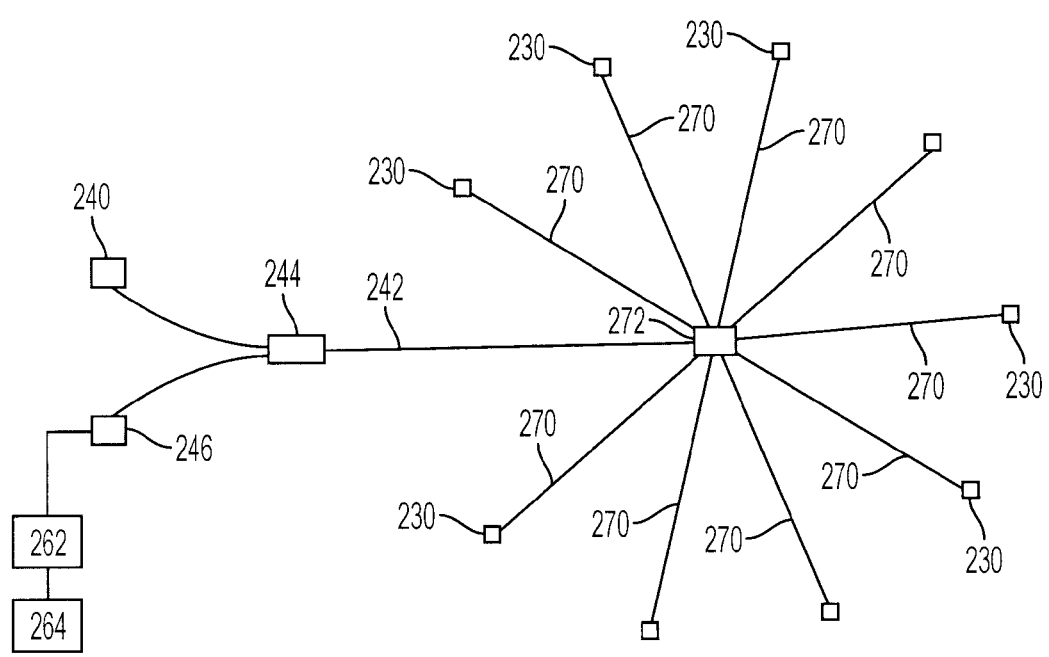
FIG. 7 is a diagrammatic illustration of an alternative embodiment of the invention including a plurality of triad sensor arrays in parallel.

Referring to FIG. 7, a third embodiment of a system for monitoring the operating condition of an electric generator is illustrated. The third embodiment includes elements similar to those described with reference to the first embodiment of FIG. 5, which elements are labeled with the same reference numbers increased by 200. In the present embodiment, light is provided to and signals are received from the plurality of triad sensor arrays 230 through a common fiber optic conductor 242 connected to a light source 240 and a detector 246 via a coupler 244. The common fiber optic conductor 242 is connected to the plurality of triad sensor arrays 230 by a plurality of fiber optic branches 270 extending from a central coupler 272 in a star configuration. Hence, the plurality of triad sensor arrays 230 are connected in a parallel arrangement, such that if a break occurs in any one of the sensors of the triad sensor arrays 230, the other triad sensor arrays 230 will not be affected.

It should be understood that the systems described with reference to FIGS. 5-7 may incorporate any of the sensor array configurations described with reference to FIGS. 3, 4 and 4A.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of monitoring the operating condition of an electric generator, said method comprising:
   locating a triad sensor array on a stator bar of the generator, said triad sensor array comprising a group of sensors including first, second and third sensors formed within a predetermined section of a fiber optic conductor;
   producing a triad signal indicative of the operating condition of a stator bar in the generator, said producing a triad signal comprising:
      producing a first, base measurement signal indicative of a stress level in the stator bar;
      producing a second, adjustment signal indicative of an adjustment to the base measurement signal and based on a measurement taken at the stator bar; and
      producing a third, dynamic measurement signal of substantially cyclically varying value and indicative of a stress level in the stator bar;
   supplying optical radiation to said fiber optic conductor for providing said triad sensor array with optical radiation for producing said first, second and third signals; and
   receiving said first, second and third signals from said triad sensor array for effecting a first stress level determination, and for effecting a second stress level determination substantially simultaneously with and independently of said first stress level determination.

2. The method of claim 1, wherein said first stress level determination comprises directly determining a stress level in each stator bar using said first and second signals from each triad sensor array associated with a respective stator bar.

3. The method of claim 2, wherein said second stress level determination comprises indirectly determining a stress level in each stator bar using said third signal from each triad sensor array associated with the respective stator bar.

4. The method of claim 3, wherein said first signal is indicative of a strain at a location of the stator bar, said second signal is indicative of a temperature of the stator bar, and said third signal is indicative of an acceleration resulting from a vibration of the stator bar.

5. The method of claim 1, wherein said first, second and third signals comprise Bragg reflections formed at each of said first, second and third sensors.

6. A system for monitoring the operating condition of an electric generator comprising a stator core including a plurality of stator bars located in circumferentially spaced relation to each other about a rotor, said system comprising:
   a fiber optic conductor;

a plurality of triad sensor arrays formed in said fiber optic conductor, each said triad sensor array associated with one of the stator bars;

each said triad sensor array comprising:
- a first sensor including a first Bragg grating for producing a base measurement signal indicative of a stress level in a stator bar of the generator;
- a second sensor including a second Bragg grating for producing an adjustment signal indicative of an adjustment to the base measurement and based on a measurement taken at the stator bar; and
- a third sensor including a third Bragg grating for producing a dynamic measurement signal of substantially cyclically varying value and indicative of a stress level in the stator bar;

a source of optical radiation coupled to said fiber optic conductor for providing said first, second and third sensors of each said triad sensor array with optical radiation for producing said base measurement signal, said adjustment signal and said dynamic measurement signal; and an optical detector coupled to said fiber optic conductor for receiving said signals from said first, second and third sensors of each said triad sensor array, wherein said base measurement signal, said adjustment signal and said dynamic measurement signal are uniquely identified to said first, second and third sensors, respectively, of each said triad sensor array.

7. The system of claim 6, wherein said first, second and third Bragg gratings are formed in close proximity to each other relative to the spacing between the locations of adjacent triad sensor arrays.

8. The system of claim 6, wherein each said triad sensor array provides a first stress level indication and a second stress level indication, associated with said signals from said first and third sensors, respectively, and indicative of the condition of a respective stator bar.

9. The system of claim 8, wherein said first sensor of each said triad sensor array is mounted to a longitudinally extending surface of the respective stator bar, and said third sensor of each said triad sensor array is mounted to an end of the respective stator bar.

10. The system of claim 6, wherein said first, second and third sensors of each triad sensor array are located in series with each other.

11. The system of claim 6, wherein said first, second and third sensors of each triad sensor array are located in parallel with each other.

12. The system of claim 6, wherein said plurality of triad sensor arrays are located in series with each other.

13. The system of claim 6, wherein said plurality of triad sensor arrays are located in parallel with each other.

14. A system for monitoring the operating conditions of an electric generator, said system comprising:

a triad sensor array formed within a predetermined section of a fiber optic conductor, said triad sensor array comprising a group of sensors including:
- a first sensor including a Bragg grating for producing a first signal representative of strain in a stator bar of the generator;
- a second sensor including a Bragg grating for producing a second signal representative of temperature in the stator bar; and
- a third sensor including a Bragg grating for producing a third signal representative of vibration amplitude in the stator bar;

a source of optical radiation coupled to said fiber optic conductor for providing said first, second and third sensors with optical radiation for producing said first, second and third signals; and an optical detector coupled to said fiber optic conductor for receiving said first, second and third signals, wherein said first, second and third signals are uniquely identified to said first, second and third sensors, respectively.

15. The system of claim 14, wherein said third sensor comprises an accelerometer.

16. The system of claim 14, wherein said first sensor is mounted to a longitudinally extending surface of the stator bar said third sensor is mounted to an end of the stator bar.

17. The system of claim 14, including additional sensor arrays formed within predetermined sections of said fiber optic conductor, each said additional sensor array located on a respective associated stator bar of the generator, each said additional sensor array including a strain sensor for producing a signal indicative of a direct stress level measurement in the associated stator bar, and an accelerometer for producing a signal indicative of an indirect stress level measurement in the associated stator bar.

18. The system of claim 17, wherein said sensors in each additional sensor array comprises a triad sensor array formed within said fiber optic conductor, including a temperature sensor for producing a signal representative of temperature in each said associated stator bar, and each said sensor in each said additional sensor array comprises a Bragg grating.

19. The system of claim 14, wherein said source of optical radiation and said optical detector are located within a shell of the generator.

20. The system of claim 14, wherein said source of optical radiation and said optical detector are located outside of a shell of the generator, and said fiber optic conductor traverses a penetration seal in the shell.

* * * * *